United States Patent [19]
Babel

[11] Patent Number: 5,099,980
[45] Date of Patent: Mar. 31, 1992

[54] PALLET EXCHANGER FOR MACHINE TOOLS

[75] Inventor: Werner Babel, Pfronten, Fed. Rep. of Germany

[73] Assignee: MAHO Aktiengesellschaft, Fed. Rep. of Germany

[21] Appl. No.: 553,076

[22] Filed: Jul. 13, 1990

[30] Foreign Application Priority Data

Jul. 17, 1989 [DE] Fed. Rep. of Germany ....... 3923574

[51] Int. Cl.⁵ ............................................. B65G 29/00
[52] U.S. Cl. .............................. 198/346.1; 414/744.3; 25/33 P; 198/465.1
[58] Field of Search ............... 198/346.1, 345.3, 465.1; 29/33 P; 414/222, 225, 744.3

[56] References Cited

U.S. PATENT DOCUMENTS

| | | | |
|---|---|---|---|
| 4,637,108 | 1/1987 | Murata et al. | 198/346.1 X |
| 4,673,076 | 6/1987 | Mattson | 198/346.1 X |
| 4,797,052 | 1/1989 | Ohta et al. | 198/345.1 X |

FOREIGN PATENT DOCUMENTS

| | | |
|---|---|---|
| 3134833 | 6/1982 | Fed. Rep. of Germany . |
| 3541600 | 5/1987 | Fed. Rep. of Germany . |
| 105857 | 5/1988 | Japan ................. 198/346.1 |

*Primary Examiner*—Robert J. Spar
*Assistant Examiner*—Donald W. Underwood
*Attorney, Agent, or Firm*—Baker, Maxham, Jester & Meador

[57] ABSTRACT

Object of the invention is a pallet exchanger for machine tools (1), which features a rotating unit (24), arranged between the workpiece table (5) and the standby position, with support elements for a form-closed and releasable fastening of a pallet. In order to transfer the workpiece pallet (6), the rotating unit (24) rotates along the vertical axis. To avoid additional support elements for the pallets, the support elements are designed as support hooks (25), which subsequent to a vertical elevation of the rotating unit (24) engage with support profiles (28) on the pallet (6) and hold the pallet self-supportedly.

6 Claims, 1 Drawing Sheet

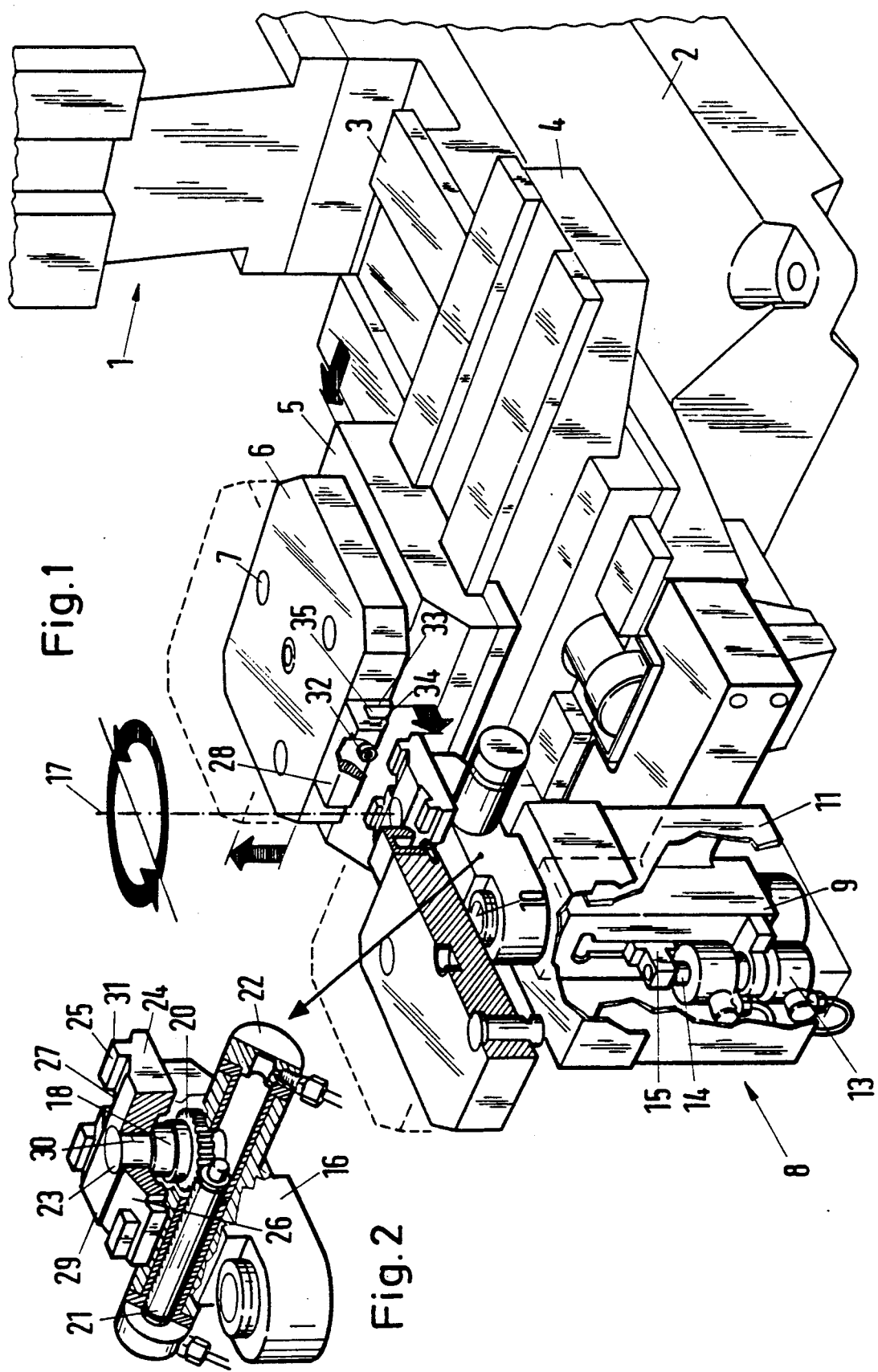

PALLET EXCHANGER FOR MACHINE TOOLS

The invention concerns a pallet exchanger for machine tools with a rotating unit arranged between a workpiece table and a standby position. This rotating unit features diametrally opposed support devices for a form-closed and releasable fastening of a pallet, and rotates vertically in order to convey the workpiece pallet from the standby position to its machining position on the workpiece table.

EP-A-224 931 describes such a pallet exchanger, the rotating unit of which shows two T-shaped vertical grooves, one on each side, which can engage with an, accordingly designed adapter unit arranged on the pallets' sides. The pallet rests in a standby position on an adjustable receptacle, which is raised at the time of a pallet exchange by a hydraulic cylinder, which in turn causes the pallets' adapter unit to align with the T-shaped groove of the rotating unit. The pallet on the work bench is raised by an additional elevating device and the pallet's adapter unit is slides up into the opposit vertical groove. A subsequent rotation of 180 by the rotating unit places the pallet on the workpice table into the standby position and concurrently positions the pallet in standby position onto the workpiece table. Vertical support for both paletts, in standby position as well as during conveyance, is provided by several semicircular support tracks with guide rolls. One of the disadvantages of this design is that the pallets have to be supported by support tracks and their mountings, which requires a relatively large amount of space and constructive effort.

Furthermore, the guiding surfaces on the bottom of the pallet as well as the guide rolls have to be protected from shavings accumulated during machining, which in turn calls for expensive cleaning devices or corresponding covers. Moreover, two independent elevation devices in additional guide units are necessary to lift the pallets, one of which is in the standby position the other on the workpiece table.

It is the invention's task to create a simply constructed pallet exchanger which does not take up much space, nevertheless allows for a quick and precise conveyance of pallets without the need for additional support elements and which is not sensitive towards the shavings and dirt caused by machining.

The invention solves this task by designing the mounting units as supporting parts, pointing up to mesh with the pallet's support profile, which faces down and supports the pallet.

This design of the mounting units according to the invention allows them to assume a lateral guide function as well as a vertical support function. During the exchange of a workpiece the rotating unit's vertical hoisting motion causes the support hooks, which point up, to mesh with the pallets' support profiles, in which case the pallet on the workpiece table, moved to the exchange position, is elevated from its receiving units while the pallet in the standby position is also elevated. Both pallets are supported by the laterally arranged support profiles so that no additional support elements are necessary even for the subsequent 180° rotation by the rotating unit. The surfaces of the support profiles contact the support hooks and are located at the inner sides, which face down, and thus are protected from accumulating shavings.

In one particularly effective design, the support hooks and support profiles are designed in the form of ledges, which provides a distribution of force and pitching momentum imposed on the support elements during the elevation process.

To secure the lateral guideway the rotating units are provided with a vertical guide groove. During the elevation process this guide groove meshes with a guide pin which is attached to the support profile, and the diameter of which corresponds to the width of the guide groove.

In another effective embodiment the vertically adjustable support column is fastened to the machine tool. This allows for an precisely positioned transfer point between the workpiece table and rotating unit and takes up very little space.

In order to arrange the standby station, for machine tools with a lengthy protruding bed, as close to the machine as possible, the rotating unit is placed at the free end of a.cantilever, which is oriented toward the workpiece table and is attached to the support column.

Further characteristics and advantages of this invention can be taken from the following description of a preferred design example, and from the drawing.

FIG. 1 is a perspective of a pallet exchanger arranged on a machine tool;

FIG. 2 is an enlarged drawing of the rotating unit;

FIG. 1 depicts a machine bed 2 of a machine tool 1, featuring a longitudinal guideway 3 for a slide 4. An adjustable workpiece table 5 is arranged perpendicularly to the longitudinal guideway 3, and a work piece pallet 6 is fastened to it by a from-closed connection. This connection comprises three, triangularly arranged, locking pins 7, the free ends of which protrude through the pallet 6 and penetrate into—not depicted—receiving bores on the workpiece table 5. A connection between workpiece pallet 6 and workpiece table 5 distinguishes itself by an accurate positioning, simple release and resistance towards dirt, since the connection elements are covered by the workpiece pallet itself during machining.

The pallet exchanger 8 itself comprises a support frame 9 raised and lowered by a motor-driven support column 10. This support column 10 is vertically displacable within the support frame 9, which is mounted on the front of the machine bed 1. The vertical displacement of the support column 10 is performed by a linear motor attached to the support frame 9, e.g. a hydraulic cylinder 13, the piston rod 14 of which is connected with a slide bar 15, which in turn is laterally attached to the support column 10 . The support frame 9 and the hydraulic cylinder 13 are surrounded by a box 11.

A cantilever 16 is fastened to the free end of the support column 10. The free end of this cantilever, which is oriented towards the workpiece table, holds a drive shaft 18, which rotates along the vertical axis of plane, with a rotating unit 24. The cantilever's 16 other end is a cylindrical recess, which receives the free end of the vertically rotating support column 10. As shown in FIG. 2 in particular, rotation of the drive shaft 18 occurs through a gear drive 20,21. A gear rim 20 attached to the drive shaft and arranged within the cantilever 16 meshes with a gear rack 21, which is designed as a piston of a dual-effective cylinder unit arranged perpendicularly within the cantilever. The free shaft end 23 of the drive shaft 18 protruding through the cantilever 16 bears a rotating unit 24.

As depicted in FIG. 2, the rectangular rotating unit 24 shows a raised cross bar 29 with two longitudinally, slanted surfaces 26. The cross bar 29 is provided with a bore 30 to receive the shaft end 23 of the drive shaft 18. The corners of the rotating unit 24 are oriented upwards and diametrally opposed support hooks 25 in form of narrow, ledge-like extensions with lateral bearing surfaces 31. Furthermore, guide grooves 27 are arranged at the lateral sides of the rotating unit 24, which are oriented towards the pallets. During a pallet exchange a guide pin 32, arranged within a support profile 28, engages with the guide groove 32.

The ledge-like support profile 28, attached laterally to the pallet 6, features a U-shaped cross section with two sides 33,34 facing down. Each of the sides 33,34 are provided with a guide surface 35, which absorbs the momentum when the support hooks 25 gear with the support profile 28. Vertical forces are absorbed by the upper plain of the support hooks 25. The diameter of the guide pin 32, arranged centrically in the inside of the support profile 28, corresponds to the width of the guide groove 27 in the rotating unit 24. When elevating the pallets, this guide pin gets aligns with the guide groove 27 in the rotating unit and thus provides a lateral guide function.

The pallet exchanger described above operates as follows:

To exchange a pallet, the workpiece table 5 is placed into the exchange position by means of a cross-slide 4 along the longitudinal guide way 3. In this position the pallet's 6 support profiles 28 align with the lowered support hooks 25 of the rotating unit 24. By activating the hydraulic cylinder 13 the support column 10 along with the rotation device 16 is elevated, while the support profiles 25 mesh with the support hooks 28. As the elevation process of the support column 10 progresses the pallet 6 affixed to the workpiece table is lifted and released from its receiving elements, until it is self-supportingly suspended from the rotation device 16, along with the pallet in standby position The guide pin 32, which is arranged laterally on the pallet and centrically within the ledge-shaped support profile 28, now meshes with the vertical guide groove 27 of the rotating unit 24 and thus prevents a possible lateral dislocation of the pallets when rotated. By controlling the cylinder unit 22 through the gear drive 20,21, a 180° rotation of the rotating unit 24 occurs and the two pallets exchange position without contact. Subsequently the support column 10 is lowered and the pallet's guide pins 7 align with the receiving elements on the workpiece table 5.

This invention is not limited to the described embodiment. Hydraulicaly activated positioning devices for example, can be replaced by other suitable drive units, such as electric motors. Furthermore, the cantilevered design of the rotation drive can be eliminated for pallet exchangers for machine tools constructed differently, which allow a more suitable placement of the pallet exchanger, in which case, for example, the rotating unit could be attached directly on the vertically adjustable support frame. Moreover, the self-supporting lateral support of the workpiece pallets according to the invention is not limited to pallet exchangers, but can also be used for example in pallet conveyance devices.

I claim:

1. A pallet exchange system for machine tools for exchanging pallets between a machine tool work table and a pallet standby area, the system comprising:

a rotating unit arrangeable between the work table and the pallet standby area and mounted for rotation about and translation along a vertical axis;

a pair of support elements, one of said support elements mounted on each of diametrically opposed sides of said rotating unit for positively and releasably securing a pallet, each said support element including a plurality of vertically oriented ledge-like extensions, each extension having an upper support surface;

said ledge-like extensions on each side being configured to support and lift, in cantilevered fashion, a pallet having a lateral U-shaped support profile, said support profile including a pair of legs comprising the sides of the U-shaped profile configured for positive and releasable engagement with said ledge-like extensions; and said rotating unit being vertically positionable along said vertical axis for engaging and lifting pallets positioned at the work table and the pallet standby area, and said rotating unit further being rotatable for exchanging the raised pallets between the work table and the pallet standby area.

2. The pallet exchange system of claim 1 wherein said rotating unit includes vertical guide grooves configured for engagemen with a guide pin arranged on said support profiles.

3. The pallet exchange system of claim 1 or claim 2, wherein said rotating unit is mounted on a rotating drive shaft, which rests on the fre end of a cantilever.

4. The pallet exchange system of claim 3, wherein said cantilever is arranged on a vertically adjustable support column.

5. The pallet exchange system of claim 4, wherein said support column is guided along a support frame, and is elevated and lowered by a motor.

6. The pallet exchange system of claim 3, wherein said drive shaft is driven through a hydraulically activated gear drive.

* * * * *